(12) United States Patent
Matsumoto

(10) Patent No.: US 7,953,296 B2
(45) Date of Patent: May 31, 2011

(54) IMAGE RESOLUTION CONVERSION WITH ERROR DETECTION

(75) Inventor: Yuki Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 11/832,920

(22) Filed: Aug. 2, 2007

(65) Prior Publication Data

US 2008/0037902 A1  Feb. 14, 2008

(30) Foreign Application Priority Data

Aug. 8, 2006 (JP) ................................. 2006-216257

(51) Int. Cl.
*G06K 9/48* (2006.01)
(52) U.S. Cl. ........................................ 382/299; 382/298
(58) Field of Classification Search .................. 382/276, 382/298, 299
See application file for complete search history.

(56) References Cited

U.S. PATENT DOCUMENTS

| | | | | |
|---|---|---|---|---|
| 5,412,428 A * | 5/1995 | Tahara | ...................... | 375/240.25 |
| 6,078,617 A * | 6/2000 | Nakagawa et al. | ........... | 375/240 |
| 6,144,775 A * | 11/2000 | Williams et al. | ............... | 382/252 |
| 6,427,030 B1 * | 7/2002 | Williams et al. | ............... | 382/252 |
| 6,983,019 B2 * | 1/2006 | Yiwen et al. | ............... | 375/240.16 |
| 2002/0133815 A1 | 9/2002 | Mizutome et al. | ................. | 725/9 |
| 2004/0095316 A1 | 5/2004 | Shibamiya et al. | ........... | 345/156 |

FOREIGN PATENT DOCUMENTS

| | | |
|---|---|---|
| JP | 2000-125132 | 4/2000 |
| JP | 2002-232709 | 8/2002 |

* cited by examiner

*Primary Examiner* — Jingge Wu
*Assistant Examiner* — Stephen R Koziol
(74) *Attorney, Agent, or Firm* — Fitzpatrick, Cella, Harper & Scinto

(57) ABSTRACT

This invention detects an area where image quality greatly changes upon resolution conversion. For this purpose, a block segmentation unit extracts a tile having Tw×Th pixels from a buffer, and stores the tile in a tile buffer. A two-colors ratio calculating unit counts the number of times the number of colors included in a surrounding pixel group positioned near a pixel of interest becomes two during raster scanning of the tile buffer, and calculates a two-colors ratio Cr. A continuous pixel ratio calculating unit calculates, as a run ratio Rr, a ratio at which pixels having the same color continue during scanning of the tile buffer. A difference calculating unit calculates a resolution conversion error Dt when an image of the tile is converted to ½ the resolution. A determination unit determines based on Cr, Rr, and Dt whether a tile of interest is suitable for resolution conversion.

7 Claims, 8 Drawing Sheets

FIG. 3

|  | Xc | Xb | Xd |
|---|---|---|---|
|  | Xa | X |  |

IMAGE RESOLUTION CONVERSION WITH ERROR DETECTION

BACKGROUND OF THE INVENTION

1. Field of the Invention

The present invention relates to an image processing technique for accurately detecting a specific image.

2. Description of the Related Art

Recently, electronic image data including a mixture of images with different attributes such as character images, natural images, and CG images have been used. It is preferable to process such an image by using image processing or an encoding method suitable for the attribute of each image area in the image.

One of characteristic image areas is a pattern image having almost constant periodicity. A pattern image is, for example, an image having a specific pixel value for each pixel, which is generated when semitransparency processing is performed for an object by setting a predetermined transparency in a presentation material or the like. Moire or roughness may occur in such an area of a printed image. In addition, subsampling or resolution conversion will cause a considerable change in image quality. For this reason, it is required to switch processes depending on the characteristic of an image when performing image processing of conversion to printout data or resolution conversion.

When, for example, the resolution of an original image is to be converted to ½ in both the horizontal and vertical directions, the average value of 2×2 pixels, i.e., four pixels, in the original image shown in FIG. 2 is often set as a pixel value after resolution conversion. Assume that an original image is a monochrome image represented by eight bits (256 gray levels) per pixel.

Assume an image whose pixel values alternately switch between 0 and 255. In this case, each pixel of the image after resolution conversion is uniformly set to "128", thus producing visible differences between the converted image and the original image. It is therefore necessary to suppress a deterioration in image quality by detecting a pattern image having constant periodicity using a technique of segmenting an image into character, natural image, and halftone dot areas.

Conventionally, there has been known a segmentation technique with a small hardware size, which exhibits high accuracy regardless of whether an image to be processed is a monochrome or color image. This is typically a scheme of segmenting an image into blocks and extracting a feature amount from the image data of a pixel of interest in each block in the main-scanning direction, thereby determining whether the pixel of interest belongs to a specific one of a solid area, photographic area, character area, halftone dot area, and the like (e.g., Japanese Patent Laid-Open No. 2002-232709).

In addition, a technique of controlling the characteristics of a gamma conversion unit by determining the continuity of black pixels within an image is known as an image processing apparatus which improves the image quality of image data obtained by raster scanning (e.g., Japanese Patent Laid-Open No. 2000-125132).

The conventional scheme, however, needs to perform determination by seeing an image in both the main-scanning direction and the sub-scanning direction. This requires complicated processing.

SUMMARY OF THE INVENTION

The present invention therefore provides a technique of accurately detecting an area, in an image, in which image quality greatly changes upon resolution conversion, by using a simpler method.

In order to solve the above problem, for example, according to the present invention, there is provided an image processing apparatus comprising:

an input unit which inputs image data for each tile having a plurality of pixels;

a resolution conversion unit which converts image data of an input tile into a resolution lower than that of the image data;

a first calculating unit which calculates a difference between image data after conversion by the resolution conversion unit and image data of a tile before resolution conversion as a resolution conversion error; and a determination unit which determines on the basis of information calculated by the first calculating unit whether an image of a tile of interest is suitable for resolution conversion.

According to the present invention, it is possible to accurately detect an area where image quality greatly changes upon resolution conversion.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing the relative positional relationship between a pixel x of interest and its surrounding pixels during scanning by a two-colors ratio calculating unit in this embodiment;

DESCRIPTION OF THE EMBODIMENTS

Embodiments of the present invention will be described in detail below with reference to the accompanying drawings.

First Embodiment

Figure 1:
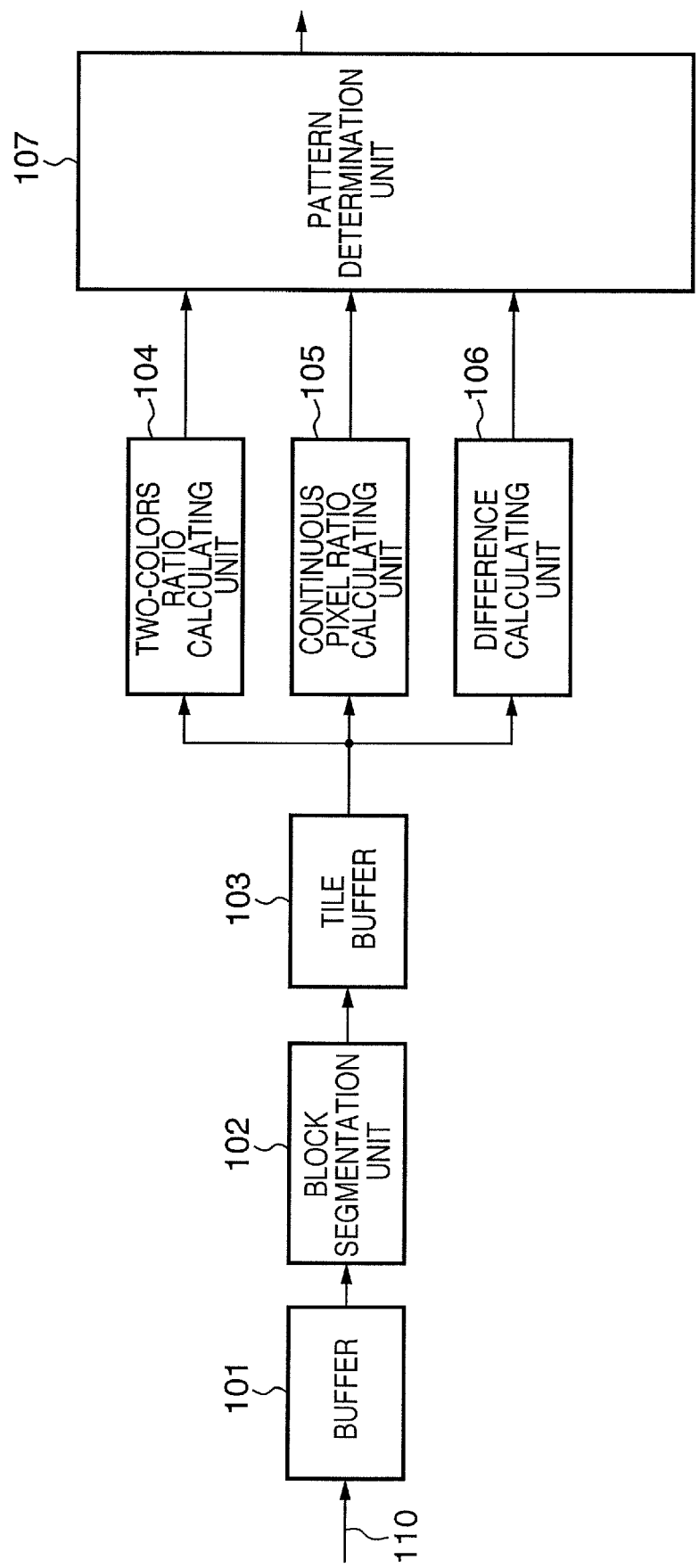
FIG. 1 is a block diagram showing the arrangement of an image processing apparatus according to the first embodiment.

FIG. 1 is a block diagram showing the arrangement of an image processing apparatus according to this embodiment. As shown in FIG. 1, the image processing apparatus according to this embodiment comprises a stripe buffer 101, block segmentation unit 102, tile buffer 103, two-colors ratio calculating unit 104, continuous pixel ratio calculating unit 105, difference calculating unit 106, and pattern determination unit 107. Reference numeral 110 denotes a signal line for inputting image data in raster scan order.

The above arrangement is designed to determine the magnitude of the degree of image quality deterioration due to resolution convention for each pixel block having a plurality of pixels.

Assume that image data to be processed in this embodiment comprises W pixels (horizontal direction)×H pixels (vertical direction), i.e., W×H pixels. Although image data may be monochrome multilevel data, assume that in this embodiment, each pixel comprises R, G, and B components and is represented by an 8-bit (256 tone levels) luminance value. Assume also that image data are dot-sequentially arranged, that is, the respective pixels are arranged in raster scan order, with each pixel being formed by arranging R, G, and B data in the order named.

Furthermore, assume that R, G, and B are respectively defined as component numbers 0, 1, and 2, and the value of a component number C of a pixel at a horizontal pixel position x and a vertical pixel position y is represented by P(x, y, C) with the upper left corner of the image being represented by coordinates (0, 0). If, for example, a pixel at position (x, y)=(3, 4) has a value represented by (R, C, B)=(255, 128, 0), then P(3, 4, 0)=255, P(3, 4, 1)=128, and P(3, 4, 2)=0.

Image data are input from the signal line 110 in raster scan order and stored in the stripe buffer 101. The stripe buffer 101 stores image data corresponding to Th lines. The stripe buffer 101 therefore has a capacity corresponding to W×Th×3 (the number of R, G, and B components).

The block segmentation unit 102 extracts Th (vertical direction)×Tw (horizontal direction) rectangular pixel blocks from one-stripe image data stored in the stripe buffer 101, and stores the pixel blocks in the tile buffer 103. For the sake of descriptive convenience, assume that the number (W) of pixels of the image which are arranged in the horizontal direction is an integer multiple of Tw, and when the image is segmented into rectangular blocks, no incomplete block is generated. Each pixel block having Tw (horizontal)×Th (vertical direction) pixels will be referred to as a tile hereinafter.

The tile buffer 103 has an area for storing pixel data corresponding to one tile, and sequentially stores pixel data output from the block segmentation unit 102 and constituting tile data. The minimum capacity required by the tile buffer 103 is therefore Tw×Th×3 (R, X, and B components) bytes. The luminance value of a component c of the pixel at the horizontal pixel position x and the vertical pixel position y of one-tile pixel data stored in the tile buffer 103 is defined as P(x, y, C), where x ranges from 0 to Tw−1, y ranges from 0 to Th−1, and C is R, G, or B.

Figure 3:
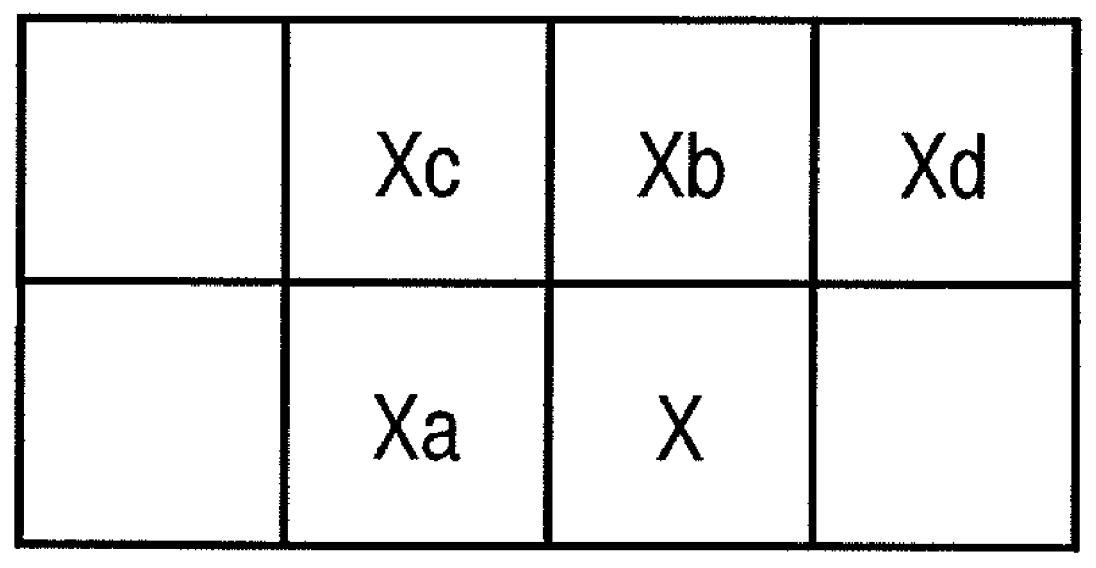

The two-colors ratio calculating unit 104 reads one-tile pixel data stored in the tile buffer 103 in raster scan order. As shown in FIG. 3, the two-colors ratio calculating unit 104 then checks the colors of four surrounding pixels Xa, Xb, Xc, and Xd of a pixel X of interest and determines whether the number of the colors of the four surrounding pixels Xa, Xb, Xc, and Xd is two. If, for example, Xa=Xb≠Xc=Xd, the two-colors ratio calculating unit 104 determines that the number of colors is two. In addition, if Xa=Xb=Xc≠Xd, the two-colors ratio calculating unit 104 determines that the number of colors is two.

Letting (i, j) ($0 \leq i \leq Tw-1$ and $0 \leq j \leq Tw-1$) be the position of the pixel X of interest, the positions of the pixels Xa and Xb can be expressed by (i−1, j) and (i, j−1), respectively. Therefore, Xa=Xb holds when the following equations hold:

$P(i-1,j,0)=P(i,j-1,0)$ $P(i-1,j,1)=P(i,j-1,1)$ $P(i-1,j,2)=P(i,j-1,2)$

The two-colors ratio calculating unit 104 sequentially updates the position of the pixel X of interest within a tile and obtains the number (F) of times that the presence of two colors is determined. Upon completion of scanning within one tile, the two-colors ratio calculating unit 104 obtains the ratio of the number F of times to the total number of pixels (Tw×Th) included in the tile as a two-colors ratio Cr, and outputs it to the pattern determination unit 107.

$Cr=F/(Tw \times Th)$

Note that when the pixel X of interest is on the first line or at the start or end position of each line, some of the surrounding pixels Xa, Xb, Xc, and Xd indicate positions outside the tile. Assume that the respective components R, G, and B of each surrounding pixel outside the tile are regarded to have a predetermined value (e.g., "0").

The antenna 105 comprises a counter Ct which is cleared to "0" at the start of processing for one tile. The continuous pixel ratio calculating unit 105 then reads the pixel data of one tile stored in the tile buffer 103 in raster scan order, and increments the counter Ct by "1" when the pixel X of interest has the same value as that of the immediately preceding pixel Xa. After the end of scanning of one tile, the continuous pixel ratio calculating unit 105 obtains a ratio Rr of the value of the counter Ct to the total number of pixels (Tw×Th) included in the tile according to the following equation and outputs the ratio Rr to the pattern determination unit 107. Note that the ratio Rr indicates the ratio of the continuity of the same color and hence will be referred to as a run ratio Rr.

$Rr=Ct/(Tw \times Th)$

Note that the continuous pixel ratio calculating unit 105 may calculate a continuous pixel ratio simultaneously with a two-colors ratio. When the pixel X of interest is at the start position (left end) of each line, the pixel Xa is outside the tile. In this case, as in the case of the two-colors ratio calculating unit 104, the pixel Xa is regarded to have a predetermined color.

The difference calculating unit 106 reads one-tile pixel data stored in the tile buffer 103 in raster scan order and calculates and outputs the difference between each pixel of the image obtained by resolution conversion (or subsampling) of the read image and a corresponding pixel value in the tile buffer. An example of resolution conversion will be described with reference to FIG. 2.

Figure 2:
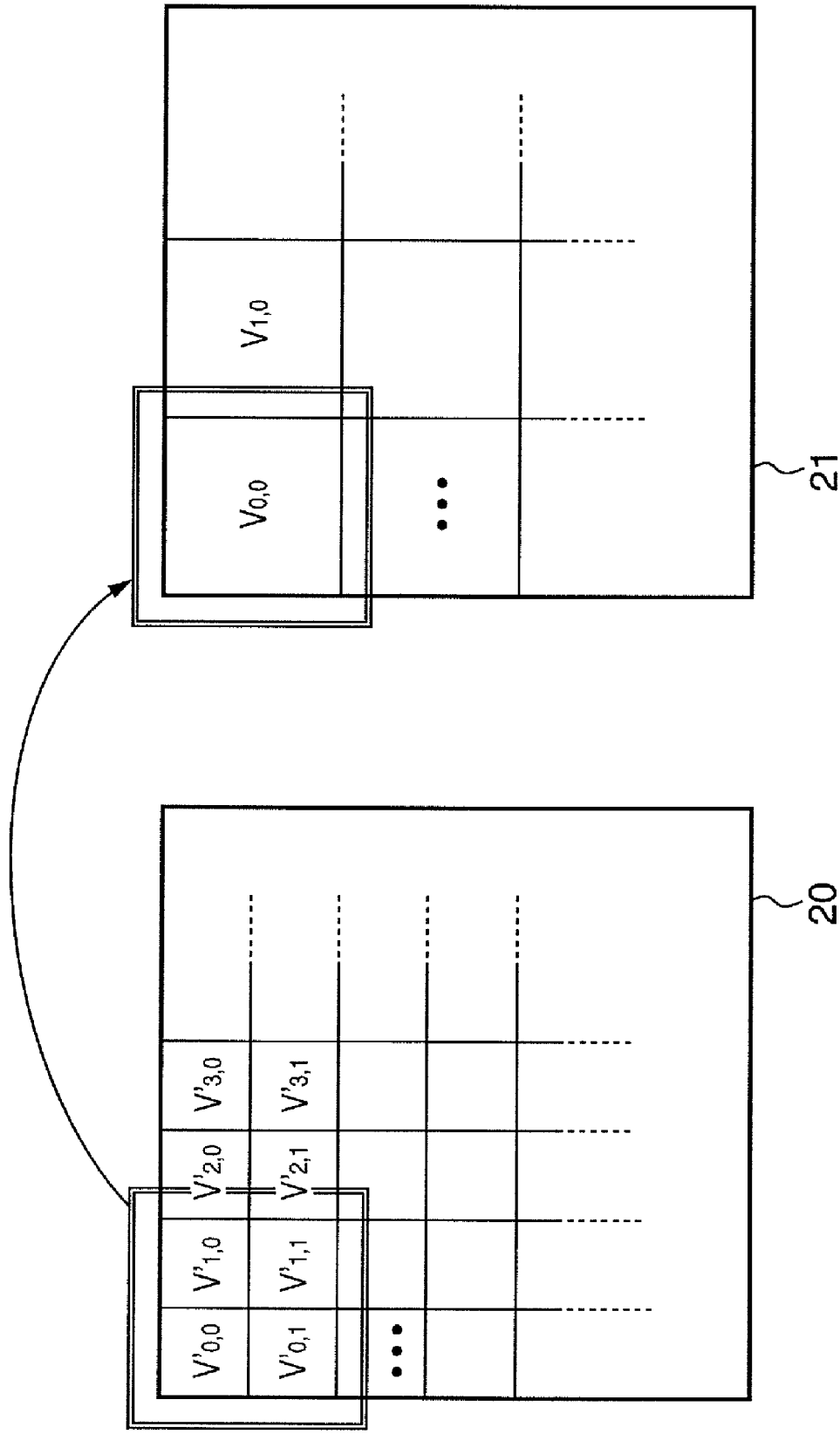
FIG. 2 is a view for explaining the contents of processing by a difference calculating unit in this embodiment.

Referring to FIG. 2, reference numeral 20 denotes image data in the tile buffer 103; and 21, image data after resolution conversion.

Assume that one pixel V in the image data 21 after resolution conversion is obtained as the average value of 2×2 pixels V' before resolution conversion. Letting V(i, j) be a pixel after resolution conversion by using a position (i, j), V(i, j) can be obtained by $$V(i, j) = \{V'(2i, 2j) + V'(2i+1, 2j) + V'(2i, 2j+1) + V'(2i+1, 2j+1)\}/4$$

A difference value D(i, j) between pixels before and after resolution conversion can be obtained according to $$D(i, j) = |V(i, j) - V'(2i, 2j)| + |V(i, j) - V'(2i+1, 2j)| + \\ |V(i, j) - V'(2i, 2j+1)| + |V(i, j) - V'(2i+1, 2j+1)|$$

(where |x| represents the absolute value of x)

Therefore, a sum total Dt of the differences between all the pixels before and after resolution conversion is given by $$Dt = \Sigma D(i,j)$$

(where $\Sigma$ represents the summation of i and j)

In practice, however, some consideration needs to be given to color components. Letting Dt(R), Dt(G), and Dt(B) be the sum totals of differences concerning the respective color components, the difference calculating unit 106 obtains Dt=Dt(R)+Dt(G)+Dt(B), and outputs the sum total Dt to the pattern determination unit 107. The value Dt is an index value indicating the magnitude of the difference in color between the respective pixels of the entire image data of the tile before and after resolution conversion and hence will be referred to as a resolution conversion error hereinafter.

The pattern determination unit 107 receives three parameters, that is, the two-colors ratio Cr, run ratio Rr, and resolution conversion error Dt respectively output from the two-colors ratio calculating unit 104, continuous pixel ratio calculating unit 105, and difference calculating unit 106. The pattern determination unit 107 determines by using the three parameters whether a tile of interest has a characteristic that the image quality greatly changes upon resolution conversion or the like, and outputs the determination result.

In this embodiment, when the following condition holds, the pattern determination unit 107 determines that the tile of interest greatly changes in image quality upon resolution conversion.

$$\text{condition: } Cr > Th1, Rr < Th2, \text{ and } Dt > Th3 \qquad (1)$$

where Th1, Th2, and Th3 represent predetermined thresholds, which the user can adjust by using an operation panel (not shown) as needed.

Figure 4:
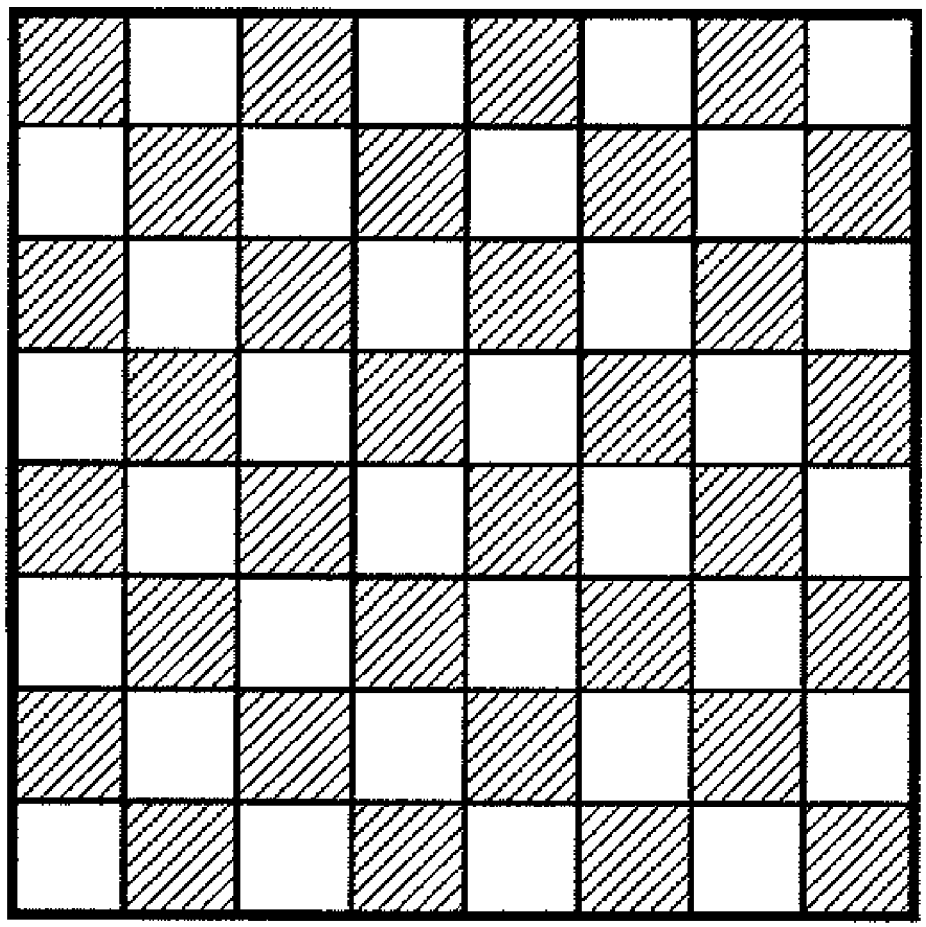
FIG. 4 is a view showing a typical example of an image subjected to determination in this embodiment.

An original image having a pattern like that shown in FIG. 4 is an example in which the image quality of image data after resolution conversion is greatly different from that of the original image.

The image in FIG. 4 is an image in which a pixel represented by R=G=B=0 and a pixel represented by R=G=B=255 alternately appear, and hence the run ratio Rr is very low, and the two-colors ratio Cr is very high. The R, G, and B values of each pixel after resolution conversion are represented by R=G=B=128, and hence the resolution conversion error Dt is very large. Obviously, this image is a typical image which satisfies the above condition.

In a natural image such as a scenery image, the colors of adjacent pixels tend to be almost identical, but are rarely completely identical. For this reason, the two-colors ratio Cr and resolution conversion error Dt of such an image tend to be small values. In addition, the run ratio Rr does not become an extremely small or large value.

According to the studies conducted by the present inventor, it is preferable to set the thresholds Th1 and Th2 for the two-colors ratio Cr and run ratio Rr to "20%" and "30%", respectively. In addition, if the tile size is 32×32, it is preferable to set the threshold Th3 for the resolution conversion error Dt to about "100". Note, however, that it is preferable to adjust these values, as needed, as described above.

Modification of First Embodiment

An example of implementing the first embodiment by using software will be described.

Figure 7:
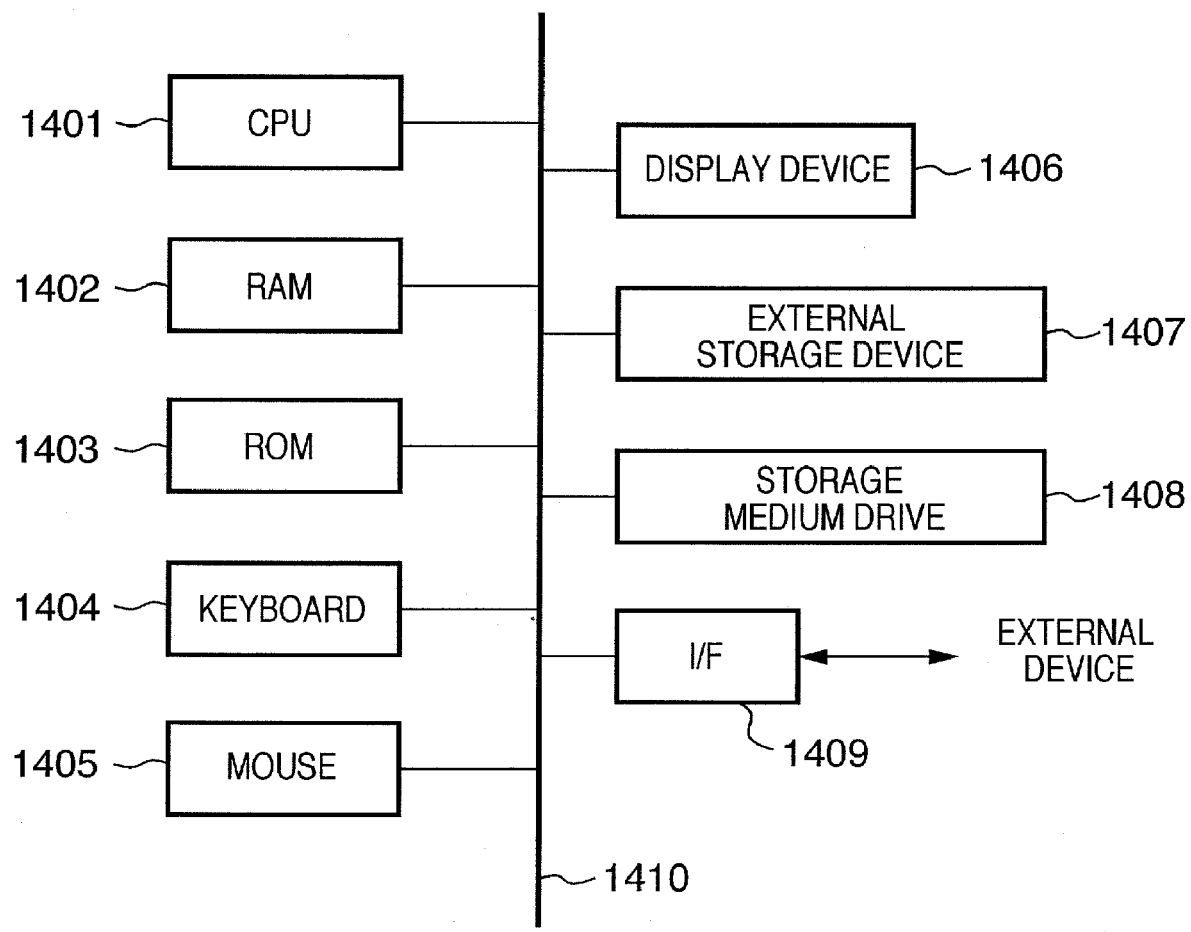
FIG. 7 is a block diagram showing an apparatus arrangement in a case wherein the first embodiment is implemented by computer programs.

FIG. 7 is a block diagram showing the arrangement of a computer. Referring to FIG. 7, reference numeral 1401 denotes a CPU which controls the overall apparatus; 1402, a RAM which is used to store programs executed by the CPU 1401 and used as a work area; and 1403, a ROM which stores a boot program, BIOS (Basic Input/Output System), and the like.

Reference numerals 1404 and 1405 denote a keyboard and a mouse, respectively, which allow the operator to input various kinds of instructions to the CPU 1401; 1406, a display device which comprises a CRT, liquid crystal screen, or the like, and can display information such as images and characters; and 1407, an external storage device which is a large-capacity information storage device such as a hard disk drive device and stores an OS (Operating System) and programs for image processing to be described later. In addition, this storage device is also used to hold image data to be processed and image data after processing.

Reference numeral 1408 denotes a storage medium drive which reads out a program or data recorded on a storage medium such as a CD-ROM or DVD-ROM and outputs it to the RAM 1402 or external storage device 1407. Note that programs for image processing to be described later and a processing target image may be recorded on this storage medium in advance. In this case, the CPU 1401 may control the storage medium drive 1408 to load these programs and data into a predetermined area on the RAM 1402.

Reference numeral 1409 denotes an I/F which connects an external device to this apparatus and allows data communication between the apparatus and the external device. Assume that an image scanner connects to the I/F 1409. Reference numeral 1410 denotes a bus which connects the above units to each other.

In the above arrangement, when the user turns on the power supply of this apparatus, the CPU 1401 accesses the external storage device 1407, and loads the OS stored in the external storage device 1407 into the RAM 1402 in accordance with the boot program in the ROM 1403, thereby functioning as an information processing apparatus. Upon receiving an instruction to activate an image processing application from the keyboard 1404 or mouse 1405, the CPU 1401 loads the image processing application program from the external storage device 1407 into the RAM 1402 and executes the program. This makes this apparatus function as an image processing apparatus.

For the sake of descriptive convenience, assume that this image processing application is an image encoding application using JPEG. Assume that this application is designed to read an original image from an image scanner connected to the interface 1409, JPEG-encode the read image data, and store the data in the external storage device 1407 as a file. Assume that the tile size in this case is a size of 16×16 pixels which is an integer multiple of 8×8 as the minimum unit in JPEG encoding (DCT to be exact).

Figure 8:
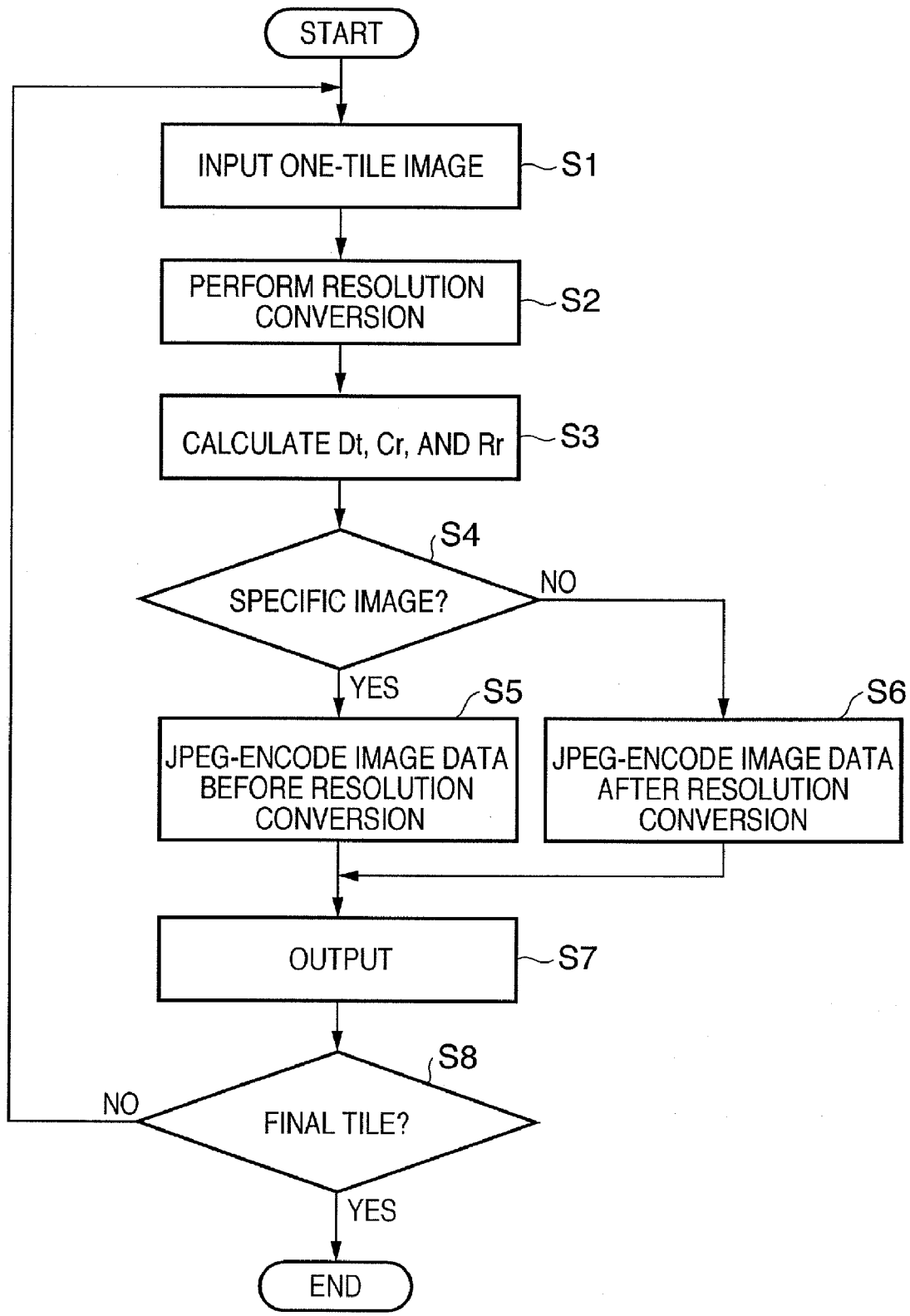
FIG. 8 is a flowchart showing an example of a processing procedure by computer programs.

FIG. 8 is a flowchart showing image processing by this application.

First of all, in step S1, the CPU receives one-tile image data from the image data read from the scanner and temporarily stores the data in a buffer. The process then advances to step S2 to perform resolution conversion of the one-tile image data. The CPU performs this resolution conversion by calculating the average value of 2×2 pixels in the input image data for each component and outputs it as one pixel. As a result, a tile of 16×16 pixels is converted into an 8×8 pixel size. This resolution conversion may be the processing of extracting a specific pixel from 2×2 pixels.

In step S3, the CPU calculates the two-colors ratio Cr and the run ratio Rr from the input tile (16×16 pixels). The CPU also calculates the resolution conversion error Dt from the input tile and 8×8 pixels after resolution conversion. Since the method of calculating the two-colors ratio Cr, run ratio Rr, and resolution conversion error Dt is the same as that described above, a repetitive description will be omitted.

In step S4, the CPU determines in accordance with condition (1) given above whether the input tile has a specific pattern property.

If the CPU determines that the input tile has a specific pattern property, i.e., that the tile of interest will greatly deteriorate in image quality with respect to the original tile upon resolution conversion, the process advances to step S5. In step S5, the CPU JPEG-encodes the original tile (32×32 pixels) stored in the buffer. In general, the CPU performs JPEG encoding by performing DCT, quantization, and entropy encoding processing on an 8×8 pixel basis, thereby generating encoded data. Therefore, the CPU encodes 32×32 pixels comprising four 8×8 pixel blocks. The CPU adds a header storing an identification bit indicating the nonexecution of resolution conversion to the head of the generated encoded data.

If the CPU determines that the input tile does not have any specific pattern property, i.e., the tile image deteriorates in quality within an allowable range with respect to the original tile image upon resolution conversion of the tile of interest, the process advances to step S6. In step S6, the CPU JPEG-encodes 8×8 pixels after resolution conversion. In step S5 described above, the CPU JPEG-encodes the four 8×8 pixel blocks. In contrast to this, in step S6, the CPU JPEG-encodes one 8×8 pixel block. In addition, the CPU adds a header storing an identification bit indicating the execution of resolution conversion to the head of the encoded data generated in step S6.

When the CPU completes encoding processing in either step S5 or step S6 in the above manner, the process advances to step S7 to output (write) the generated encoded data as part of the output file saved in the external storage device 1407. The CPU then determines in step S8 whether all the tiles corresponding to one page have been encoded. If the result is NO in step S8, the CPU repeats the processing in step S1 and subsequent steps. If the result is YES in step S8, the CPU closes the output file saved in the external storage device 1407 and terminates this processing.

As a result of the above processing, when image data is to be compressed/encoded, the image data of a tile which does not deteriorate in image quality much upon resolution conversion is encoded after resolution conversion. This makes it possible to increase the compression ratio as compared with general JPEG encoding. In addition, with regard to an image which greatly deteriorates in image quality upon resolution conversion, it is possible to maintain the compression ratio at least at the same level as that in general JPEG encoding.

When decoding processing is to be performed, it suffices to check the header of each tile, convert the resolution of encoded data having an identification bit indicating resolution conversion to 16×16 pixels upon decompression of the encoded data into the image data of 8×8 pixels, and output the resultant image data. It suffices to use a linear interpolation technique for resolution conversion in this case.

Second Embodiment

The first embodiment and its modification have exemplified the pattern image which is a one-dot/one-space image. However, there are so many types of patterns, and the tendency of a two-colors ratio, run ratio, and difference value may change depending on the type of pattern. It therefore suffices to change the condition for pattern detection depending on the type of pattern.

For example, PowerPoint (registered trademark) as a presentation application which Microsoft, U.S.A. provides has a function of allowing to select a halftone dot transparency by semitransparency processing. A pattern image exhibits a parameter distribution totally different from that of one-dot/one-space image depending on transparency. For example, in a halftone dot portion with a transparency of less than 20%, the two-colors ratio Cr is low, the run ratio Rr is high, and the resolution conversion error Dt is small.

For this reason, the thresholds for the pattern detection condition are alleviated such that the thresholds Th1, Th2, and Th3 for the two-colors ratio Cr, run ratio Rr, and resolution conversion error Dt are respectively set to 10%, 50%, and 360. In this manner, thresholds are set to cope with any type of halftone dot patterns. Only alleviating the thresholds for parameters can improve the detection accuracy of a specific pattern but may lead to erroneous determination on areas other than specific pattern areas. The second embodiment will exemplify a case wherein a parameter is added to the condition for pattern detection to suppress such erroneous determination.

Figure 5:
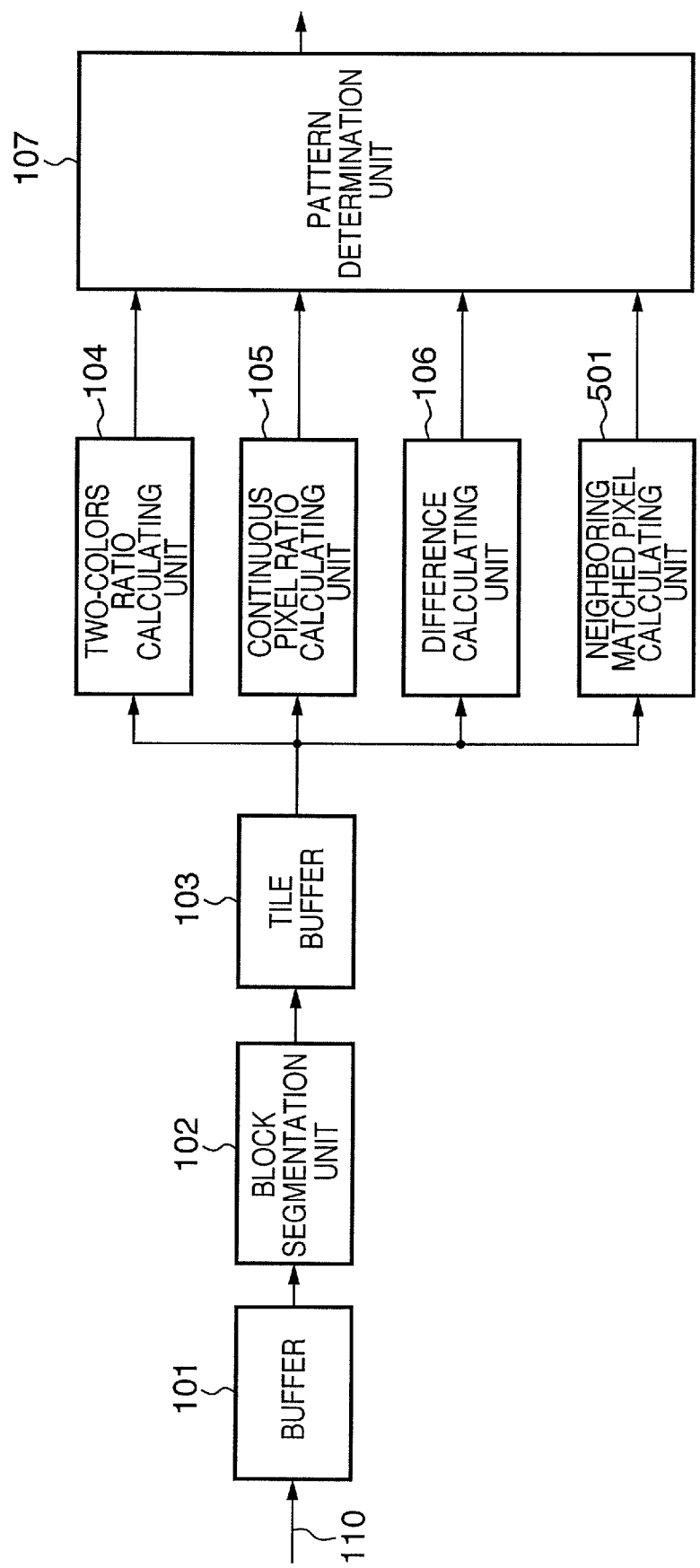
FIG. 5 is a block diagram showing the arrangement of an image processing apparatus according to the second embodiment.

FIG. 5 is a block diagram showing the arrangement of an image processing apparatus according to the second embodiment of the present invention. The same reference numerals as in FIG. 1 denote the same constituent elements of the image processing apparatus according to the second embodiment in FIG. 5, and a repetitive description will be omitted.

As shown in FIG. 5, the image processing apparatus according to the second embodiment has the same arrangement as that of the image processing apparatus according to the first embodiment shown in FIG. 1 except that a neighboring matched pixel calculating unit 501 is added thereto.

The neighboring matched pixel calculating unit 501 acquires neighboring matched pixel information from one-tile image data stored in a tile buffer 103.

Neighboring matched pixel information is obtained by the processing of checking four pixels Xa, Xb, Xc, and Xd surrounding a pixel X of interest (see FIG. 3) during scanning within a tile and determining whether any of the four surrounding pixels has a color matching (has the same color as) the color of the pixel X of interest, as in the case of a two-colors ratio or run ratio. If it is determined that there is a matched pixel, the determination result is "1". Otherwise, the determination result is "0". The neighboring matched pixel calculating unit 501 counts the number of "1"s during scanning, and outputs the count value at the end of scanning as a neighboring matched pixel count K.

A pattern determination unit 107 receives four parameters output from a two-colors ratio calculating unit 104, a continuous pixel ratio calculating unit 105, a difference calculating unit 106, and the neighboring matched pixel calculating unit 501. The pattern determination unit 107 detects a pattern as an area where the image quality greatly changes due to resolution conversion or the like, by using the four parameters, and outputs the detection result.

As in the second embodiment, calculating the neighboring matched pixel count K makes it possible to calculate a ratio Cr/K of the number of pixels, each having four surrounding pixels including two types of pixels, to the number of neighboring matched pixels. In a pattern area, Cr/K is distributed almost 100%. In a natural image area, however, Cr/K is distributed around 60% to 80%. Therefore, this makes it possible to suppress erroneous determination on a natural image area which has occurred upon alleviation of the three remaining parameters.

More specifically, when the following condition holds, the pattern determination unit 107 determines that the image of the tile of interest has a specific image property.

condition: $Cr>Th1$, $Rr<Th2$, $Dt>Th3$, and $Cr/K>Th4$ (2)

As a result of the above processing, according to the second embodiment, it is possible to improve the accuracy of specific pattern detection.

As is obvious from the modification of the first embodiment, processing equivalent to the processing in the second embodiment can be implemented by a computer program. That is, it suffices to calculate the neighboring matched pixel count K in step S3 in FIG. 8 and perform determination in accordance with condition (2) given above in step S4.

Third Embodiment

The second embodiment has exemplified the case wherein different parameters are used depending on differences in halftone dot transparency. However, the distribution tendency of parameters differs depending on not only the type of pattern but also on differences in background images. The third embodiment therefore will exemplify a case wherein pattern detection methods are switched depending on the background of a pattern to be detected.

Figure 6:
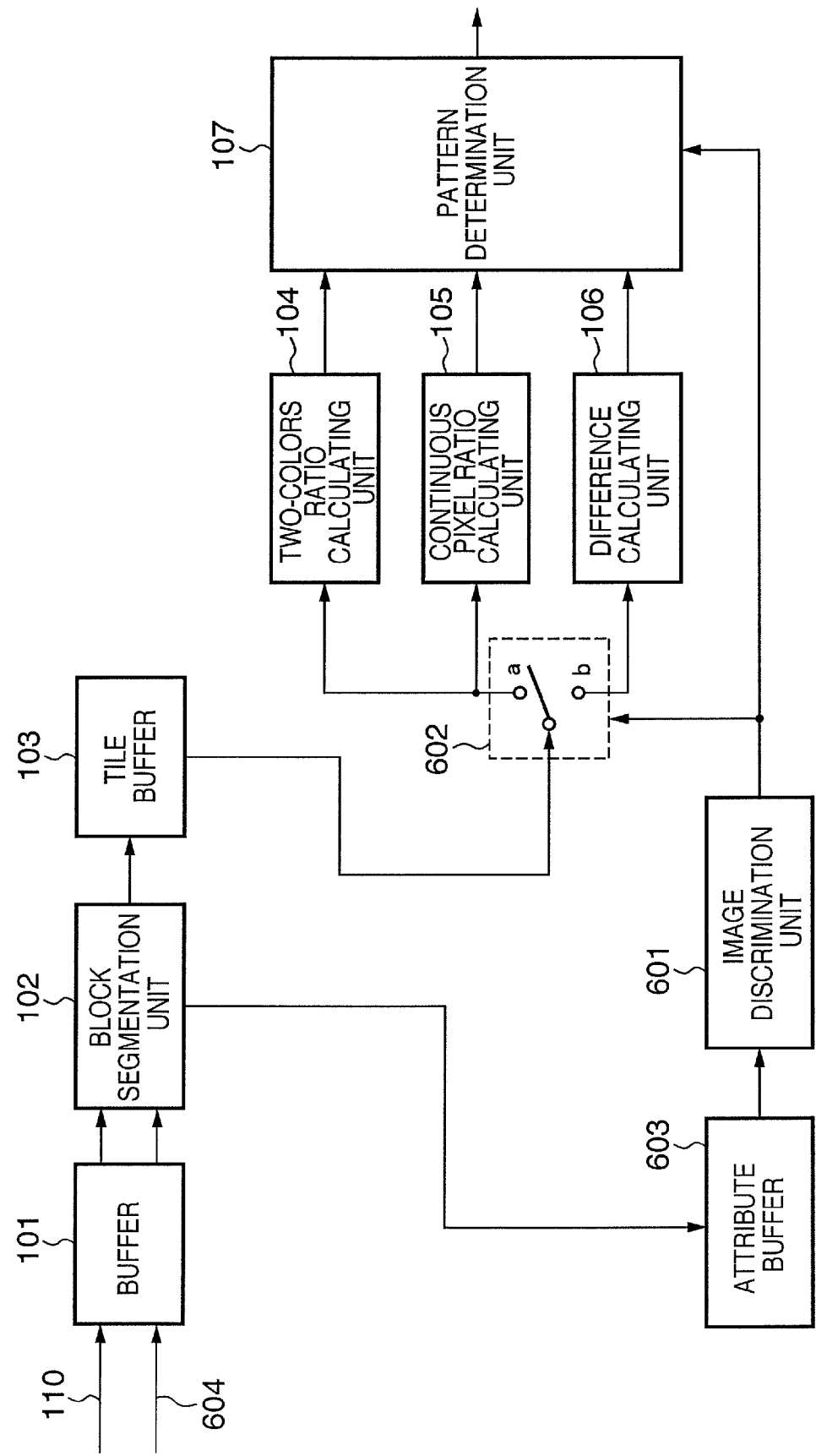
FIG. 6 is a block diagram showing the arrangement of an image processing apparatus according to the third embodiment.

FIG. 6 is a block diagram showing the arrangement of an image processing apparatus according to the third embodiment. The same reference numerals as in FIG. 6 denote the same functional blocks of the image processing apparatus according to the first embodiment shown in FIG. 1.

As shown in FIG. 6, the image processing apparatus according to the third embodiment has the same arrangement as that of the image processing apparatus according to the first embodiment shown in FIG. 1 except that an image discrimination unit 601, switch 602, attribute buffer 603, and signal line 604 are added thereto.

Processing performed by the image processing apparatus according to the third embodiment will be described below with reference to FIG. 6. Since the basic operation is the same as that of the image processing apparatus according to the first embodiment described above, characteristic portions of the third embodiment will be described below.

In the third embodiment, a buffer 101 receives image attribute information from the signal line 604, together with image data. Assume that the attribute information acquired from the signal line 604 is information having, for each pixel, a flag of 1 indicating character data or a flag of 0 indicating data other than character data. For the sake of easy understanding, assume that such attribute information is obtained when print data described in page description language (PDL) is received and rendered. This is because, in the processing of rendering a character pattern on the basis of scalable font data such as outline vector data, each pixel of the rendered pattern can be determined as character-line image data. When an image is read by an image scanner, the resolution slightly decreases. However, if the difference in luminance (or density) between a pixel of interest and an adjacent pixel is equal to or more than a threshold, the pixel can be determined as character-line image data.

The attribute buffer 603 stores only one-tile attribute information input from the signal line 604. The attribute buffer 603 has an area for storing one-tile attribute information, and sequentially stores attribute information output from a block segmentation unit 102. Note that data stored in a tile buffer 103 is synchronized with data stored in the attribute buffer 603.

The image discrimination unit 601 reads one-tile attribute information stored in the attribute buffer 603 in raster scan order and discriminates an image from the read attribute information. The image discrimination unit 601 detects whether a given tile is a tile having a character attribute or natural image attribute, depending on the ratio at which pixels having character attributes exist in each tile. If, for example, more than half of the pixels of tile data have character attributes, the image discrimination unit 601 determines that the tile of interest is a character image. If less than half of the pixels have character attributes, the image discrimination unit 601 determines that the tile is a natural image. If the tile size is 32×32, the number of pixels included in each tile is 1,024. If the threshold is "512", which is half of the number of pixels, a tile including 512 or more pixels having character attributes is determined as a character image, and a tile including less than 512 pixels having character attributes is determined as a natural image. Upon determining that a tile of interest includes many character attributes, the image discrimination unit 601 outputs "0" as a control signal. Upon determining that a tile of interest includes many natural image attributes, the image discrimination unit 601 outputs "1" as a control signal.

The switch 602 receives a control signal output from the image discrimination unit 601 to perform switching operation. If the image discrimination unit 601 determines that tile data output from the tile buffer 103 is a character area, i.e., that control signal "0" is output, the switch 602 selects a terminal Sa. As a result, a two-colors ratio calculating unit 104 and continuous pixel ratio calculating unit 105 respectively calculate a two-colors ratio Cr and continuous pixel ratio Rr.

If the image discrimination unit 601 determines that the tile data is a natural image area, i.e., that control signal "1" is output, the switch 602 selects a terminal Sb. As a result, a difference calculating unit 106 calculates a resolution conversion error Dt.

A pattern determination unit 107 determines, in accordance with the control signal output from the image discrimination unit 601, whether to perform pattern detection by using only the two-colors ratio Cr and run ratio Rr or to perform pattern detection by using only the resolution conversion error Dt, thereby determining the presence/absence of a pattern having a specific property.

If, for example, control signal "0" is output, the pattern determination unit 107 performs pattern detection on the basis of the two-colors ratio Cr and the run ratio Rr. If control signal "1" is output, the pattern determination unit 107 performs pattern detection by using only the resolution conversion error Dt.

The reason why the above operation is performed is that it is difficult to perform pattern detection in an area where a specific pattern overlaps a character pattern because the resolution conversion error Dt varies even though the tendencies of the distributions of two-colors ratios Cr and run ratios Rr remain unchanged. That is, in a character area, it is possible to perform pattern detection by using only the two-colors ratio Cr and the run ratio Rr. In pattern area where the color of a halftone dot portion is similar to that of a background, the parameter distributions of two-colors ratios Cr and run ratios Rr remain unchanged, but the difference value is small. Therefore, in such an image, pattern detection is performed by using only the two-colors ratio Cr and the run ratio Rr.

An area where a specific pattern overlaps a natural image tends to have a parameter distribution similar to that of a natural image area where the two-colors ratio Cr is low and the run ratio Rr is high. For this reason, although it is difficult to improve the accuracy of detection of a pattern area by using the two-colors ratio Cr and the run ratio Rr, the resolution conversion error Dt exhibits a high value like a one-dot/one-space area, and the distribution tendency remains unchanged. Therefore, it is possible to perform pattern detection by using the resolution conversion error Dt. This makes it possible to perform pattern detection by using only a difference value, i.e., a simpler method of changing the parameter settings depending on the type of image to be processed.

It is obvious from the above description that it is possible to implement processing equivalent to that in the third embodiment by using computer programs.

For the sake of simplicity, it is assumed in this embodiment that image data having attribute information is input. However, it suffices to perform image discrimination by using another technique, e.g., a technique of discriminating a natural image area or a character area by referring to the number of colors existing in each tile by using tile data output from the tile buffer 103.

The respective embodiments of the present invention have been described above. As described above, however, the present invention allows computer programs to obtain the same functions and effects equivalent to those of the above embodiments. In general, computer programs are stored in a computer-readable storage medium such as a CD-ROM. Setting them in a computer reading device (read drive) and copying or installing them in a system can execute the programs. Obviously, therefore, the present invention incorporates such a computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216257, filed Aug. 8, 2006, which is hereby incorporated by reference herein in its entirety.

What is claimed is:

1. An image processing apparatus comprising:
   an input unit which inputs image data having a plurality of tiles, each tile having a plurality of pixels;
   a resolution conversion unit which converts image data of an input tile into a resolution lower than that of the image data;
   a first calculating unit which calculates a difference between image data after conversion by said resolution conversion unit and image data of a tile before resolution conversion as a resolution conversion error;
   a second calculating unit which calculates a run ratio at which pixels having the same color continue in the image data of the tile;
   a third calculating unit which calculates a two-colors ratio which is a ratio at which the number of colors in a tile of interest becomes two by counting the number of surrounding pixel groups which are located near a pixel position of interest, which include two colors during raster scanning of the image data of the tile; and
   a determination unit which determines, on the basis of information calculated by said first, said second, and said third calculating units, whether an image of a tile of interest has a characteristic that (a) the calculated image data difference is large, (b) the run ratio is small, and (c) the two-colors ratio is large.

2. The apparatus according to claim 1, further comprising a count unit which counts the number of times a surrounding pixel group located near a position of a pixel of interest includes a pixel having the same color as that of the pixel of interest during raster scanning of image data of a tile,
   wherein said determination unit determines whether an image of a tile of interest is suitable for resolution conversion, by also referring to the number of times said count unit counts.

3. The apparatus according to claim 1, further comprising an attribute information input unit which inputs attribute information indicating whether each pixel is a character pixel, and
   an identifying unit which identifies whether a tile of interest has a property of a character image or a property of a natural image, in accordance with a ratio indicating that attribute information of each pixel included in the tile of interest indicates a character pixel,
   wherein when said identifying unit identifies that a tile of interest has a property of a natural image, said determination unit determines an image of the tile of interest in accordance with information calculated by said second calculating unit and said third calculating unit, and
   when said identifying unit identifies that a tile of interest has a property of a character image, said determination unit determines an image of the tile of interest in accordance with information calculated by said first calculating unit.

4. An image encoding apparatus which compression-encodes image data by using an image processing apparatus defined in claim 1, comprising:
   a resolution conversion unit which converts image data of a tile of interest into an image having a resolution lower than that of the image data;
   a first encoding unit which, when said determination unit determines a tile of interest is not suitable for resolution conversion, generates encoded data to which an identification bit indicating nonexecution of resolution conversion is added by encoding a tile before resolution conversion;
   a second encoding unit which, when said determination unit determines a tile of interest is suitable for resolution conversion, generates encoded data to which an identification bit indicating execution of resolution conversion is added by encoding a tile before resolution conversion; and
   an output unit which outputs the encoded data generated by said first encoding unit and said second encoding unit.

5. A control method for an image processing apparatus, comprising the steps of:
   inputting image data for each tile having a plurality of pixels;
   converting image data of an input tile into a resolution lower than that of the image data;
   a first calculating step for calculating a difference between image data after conversion in the converting step and image data of a tile before resolution conversion as a resolution conversion error;
   a second calculating step for calculating a run ratio at which pixels having the same color continue in the image data of the file;
   a third calculating step for calculating a two-colors ratio which is a ratio at which the number of colors in a tile of interest becomes two by counting the number of surrounding pixel groups which are located near a pixel position of interest, which include two colors during raster scanning of the image data of the tile; and
   a determining step for determining, on the basis of information calculated in the first, second, and third calculating steps whether an image of a tile of interest has a characteristic that (a) the calculated image data difference is large, (b) the run ratio is small, and (c) the two-colors ratio is large.

6. A non-transitory computer-readable medium storing a computer program which is read and executed by a computer to function as an image processing apparatus which determines an area having a specific property in an image data, causing the computer to execute inputting image data for each tile having a plurality of pixels, converting image data of an input tile into a resolution lower than that of the image data, a first calculating step for calculating a difference between image data after conversion in the converting step and image data of a tile before resolution conversion as a resolution conversion error, a second calculating step for calculating a run ratio at which pixels having the same color continue in the image data of the file;

a third calculating step for calculating a two-colors ratio which is a ratio at which the number of colors in a tile of interest becomes two by counting the number of surrounding pixel groups which are located near a pixel position of interest, which include two colors during raster scanning of the image data of the tile; and a determining step for determining, on the basis of information calculated in the first, second and third calculating steps whether an image of a tile of interest has a characteristic that (a) the calculated image data difference is large, (b) the run ratio is small, and (c) the two-colors ratio is large.

7. The apparatus according to claim 1, wherein, if defining the difference to be calculated by said first calculation unit as "Dt", the run ratio to be calculated by said second calculation unit as "Rr", and the two-colors ratio to be calculated by said third calculation unit as "Cr", said determination determines if following condition holds $Cr>Th1, Rr<Th2$ and $Dt>Th3$, where Th1, Th2 and Th3 represent predetermined thresholds.

* * * * *